Figure 1:
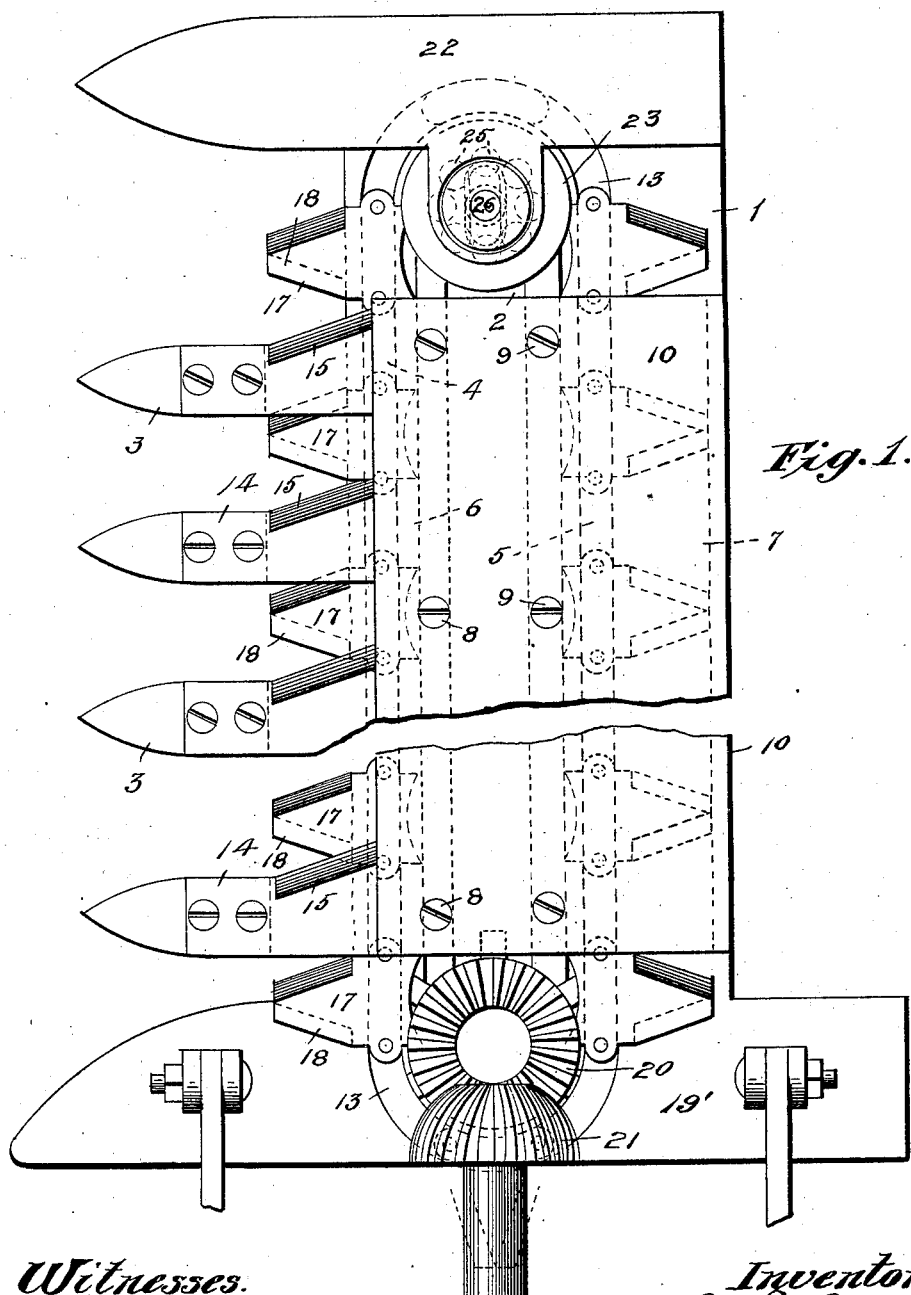

No. 673,389. Patented May 7, 1901.
D. T. DENTON.
HARVESTER.
(Application filed June 28, 1900.)
(No Model.) 2 Sheets—Sheet 1.

Witnesses.
Inventor:
per Attorney.

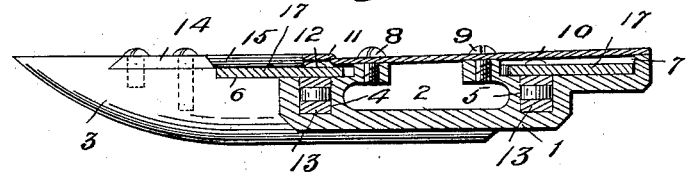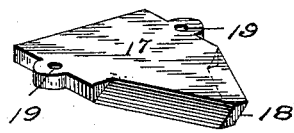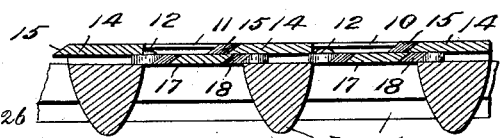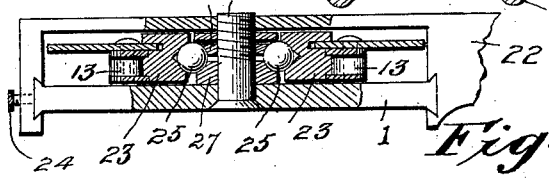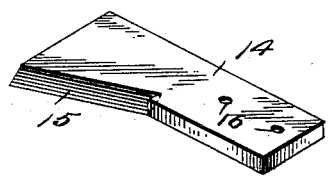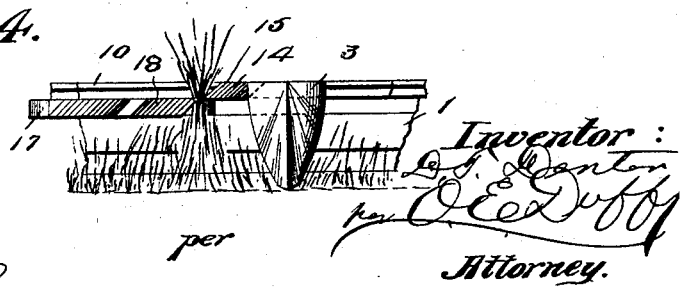

UNITED STATES PATENT OFFICE.

DANIEL T. DENTON, OF LAKEVIEW, MINNESOTA.

HARVESTER.

SPECIFICATION forming part of Letters Patent No. 673,389, dated May 7, 1901.

Application filed June 28, 1900. Serial No. 21,897. (No model.)

*To all whom it may concern:*

Be it known that I, DANIEL T. DENTON, a citizen of the United States, residing at Lakeview, in the county of St. Louis and State of Minnesota, have invented certain new and useful Improvements in Harvesters; and I do hereby declare the following to be a full, clear, and exact description of the invention, such as will enable others skilled in the art to which it appertains to make and use the same.

My invention relates to harvesters, but more particularly to their cutting apparatus, and has for one object to provide a cutting means for reapers and mowers whereby the endless sickle is rendered practically operative.

A further object of my invention is to provide an endless cutting means for reapers and mowers whereby the endless-sickle chain and the accompanying grooves and races will not become choked and clogged by litter, and thus obviate the greatest defect in existing endless-sickle machines.

With these objects in view I have constructed a cutting apparatus for the above-named purpose which is simple in its operation, cheap to manufacture, and, above all, durable and efficient.

My invention also consists in certain other novel features of construction, which will be hereinafter more fully explained and afterward more particularly pointed out in the appended claims.

Referring to the accompanying drawings, Figure 1 is a plan view of my invention, the central portion being broken away in order to enlarge the view. Fig. 2 is a sectional view through the finger-bar and endless sickle. Fig. 3 is a longitudinal sectional view through the fingers and cutting-knives, the ends of the finger-bar being broken away. Fig. 4 is a front elevation of one of the fingers and cutting-knives, showing the same in an operative position. Fig. 5 is a perspective of one of the cutting-knives, showing the cutting edges having opposite bevel. Fig. 6 is a perspective of one of the steel cutting edges, which is secured to the top of the finger. Fig. 7 is a sectional view through the pulley located in the outside drag-shoe.

Like numerals of reference indicate the same parts throughout the several figures, in which—

1 is the finger-bar, hollowed out at 2 for the purpose of lightness and carrying the fingers 3, said finger-bar being provided with the chain-races 4 and 5 and the cutting-knife grooves 6 and 7, said groove 6 extending into the fingers, as shown in Fig. 2.

On either side of the hollow 2 and between the two chain-grooves 6 and 7 are screws 8 and 9 for the purpose of securing the covering-plate 10 to the finger-bar. Said plate 10 is offset at 11 in order to allow the rivets or pin-heads 12 of the chain 13 to pass freely under.

14 is a steel plate having a downwardly-beveled cutting edge 15 and provided with two screw-holes 16. Said steel plate is set into the top of the finger, so that the finger, the steel plate, and the offset portion of the covering-plate 10 are flush, the covering-plate proper being slightly raised, so that the rivets or pin-heads 12 will clear said covering-plate on their return run. Said covering 10 and steel plate 14 entirely cover the finger-bar, grooves, and races, having no opening for litter to enter.

17 represents the cutting-knives, having oppositely-beveled cutting edges at 18, thus making them reversible, said cutting-knives being provided with pins or rivet-holes 19 to carry the pins or rivets which secure said knives to the chain 13.

19' is the inside drag-shoe, which carries the bevel-geared sprocket-wheel 20, said wheel meshing with the operating bevel gear-wheel 21. The teeth of said gear-wheels are formed with curved or convex outer edges, and the spaces between them with convex bottoms, and their pivotal points are approximately in line with the pitch-lines or center lines when they are in mesh with the body of the wheels at right angles to each other.

22 is the outside drag-shoe, in which is journaled the pulley or idler 23. The shoe is dovetailed to the outer end of the finger-bar and held at any longitudinal adjustment by the set-screw 24.

25 indicates the ball-bearings upon which the pulley 23 is mounted. The pivot-pin 26 is secured at its upper end in the shoe and passed into a slot in the finger-bar at its lower end. The inner surface of the pulley 23 has a V-groove, which groove, together with the corresponding grooves in the cones 27 and 28, form a race for the balls 25, said cones being adjusted in the ordinary manner.

It is my intention to provide an oil-cup in some convenient place, whereby the chain and corresponding grooves and races may be kept thoroughly lubricated, thus reducing the friction and rendering the entire cutting apparatus practically noiseless.

Having thus described the several parts of my invention, its operation is as follows: When the bevel-geared sprocket-wheel 20 is turned by the operating gear-wheel 21, the chain 13 is driven by said sprocket-wheel and carries the cutting-knives 17 in the direction contrary to the hands of a watch. As aforesaid, the edges of the cutting-knives are beveled in opposite directions, so that the edge nearest the steel cutting edge 15 is always beveled on the under side, exactly the reverse of the ordinary endless-sickle cutting-knives.

As aforesaid, the steel plate 14 is provided with a beveled cutting edge 15, said bevel being on the top of the plate 14. In this manner when the cutting-knives are driven under said steel plate 14 the cutting edges of said knives form a shear cut with the cutting edges 15, as shown in Fig. 4.

By this construction the danger of having the chain and driving mechanism choked and clogged with litter is reduced to a minimum, as there is not a single crevice or opening in the top of the fingers or finger-bar wherein the cut hay or grass can lodge, thus obviating the most dangerous and troublesome defect in endless-sickle apparatus and making their use many times more effective, saving labor, and reducing the wear and expense for repairs to the entire cutting apparatus.

Having thus fully described the operation of my invention, I do not wish to be understood as limiting myself to the exact construction therein set forth, as various slight changes might be made therein by those skilled in the art, and I consider myself entitled to all such changes and modifications which fall within the limit and scope of my invention.

What I claim as new, and desire to secure by Letters Patent of the United States, is—

1. In an endless sickle for harvesters, the combination with a finger-bar provided with a sprocket-wheel at its inner end, a shoe secured to the outer end, means for securing it to any adjustment, an idler journaled in said shoe, an endless chain, cutting-knives carried thereon, having diverging cutting edges, said edges being beveled on the upper and lower faces respectively of the cutting-knives in combination with cutting-plates secured to the top of the fingers, said plates being beveled downwardly toward the coacting edges of the knives, substantially as described.

2. In an endless sickle for harvesters, the fingers and finger-bar provided with chain-races and knife-depressions, a plate covering the same, an offset in said plate above the drive-chain, pins for securing the cutting-knives to said drive-chain, the whole arranged in such a manner that said pins are free to pass under the covering-plate by reason of the offset therein, in combination with cutting-plates secured to the top of the fingers and cutting-knives substantially as described.

3. In an endless sickle for harvesters, the combination with the finger-bar, of a drive-chain carried therein, a plate substantially covering said chain, its rear portion being slightly inclined upwardly toward its rear to clear the rivet-heads, cutting-knives secured to said chain by rivets having projecting heads, their advance cutting edges being beveled on their lower sides, plates secured above the cutting-knives, and beveled on their upper sides toward the coacting edges of the cutting-knives, substantially as described.

4. In an endless sickle, the combination with the fingers and finger-bar of cutting-knives carried therein, a plate covering said finger-bar, an offset in said plate, plates secured to said fingers flush with the top of said fingers and offset, and beveled downwardly toward the coacting edges of the cutting-knives, a drive-chain traveling under the offset, pins securing said knives to said chain, and arranged in such a manner that they are free to pass under said covering-plate and offset, substantially as described.

5. In an endless sickle the combination with the fingers and finger-bar, upwardly-projecting pins securing the cutting-knives, of a covering-plate slightly upwardly inclined toward its rear, an offset in said plate near its front edge over the pins when in their forward position whereby the pins securing the cutting-knives are allowed to pass freely under, steel plates having edges downwardly beveled toward the coacting edges of the cutting-knives, and cutting-knives upwardly beveled toward said steel plates substantially as described.

In testimony whereof I affix my signature in presence of two witnesses.

DANIEL T. DENTON.

Witnesses:
ISAAC HILL,
H. B. DENTON.